UNITED STATES PATENT OFFICE.

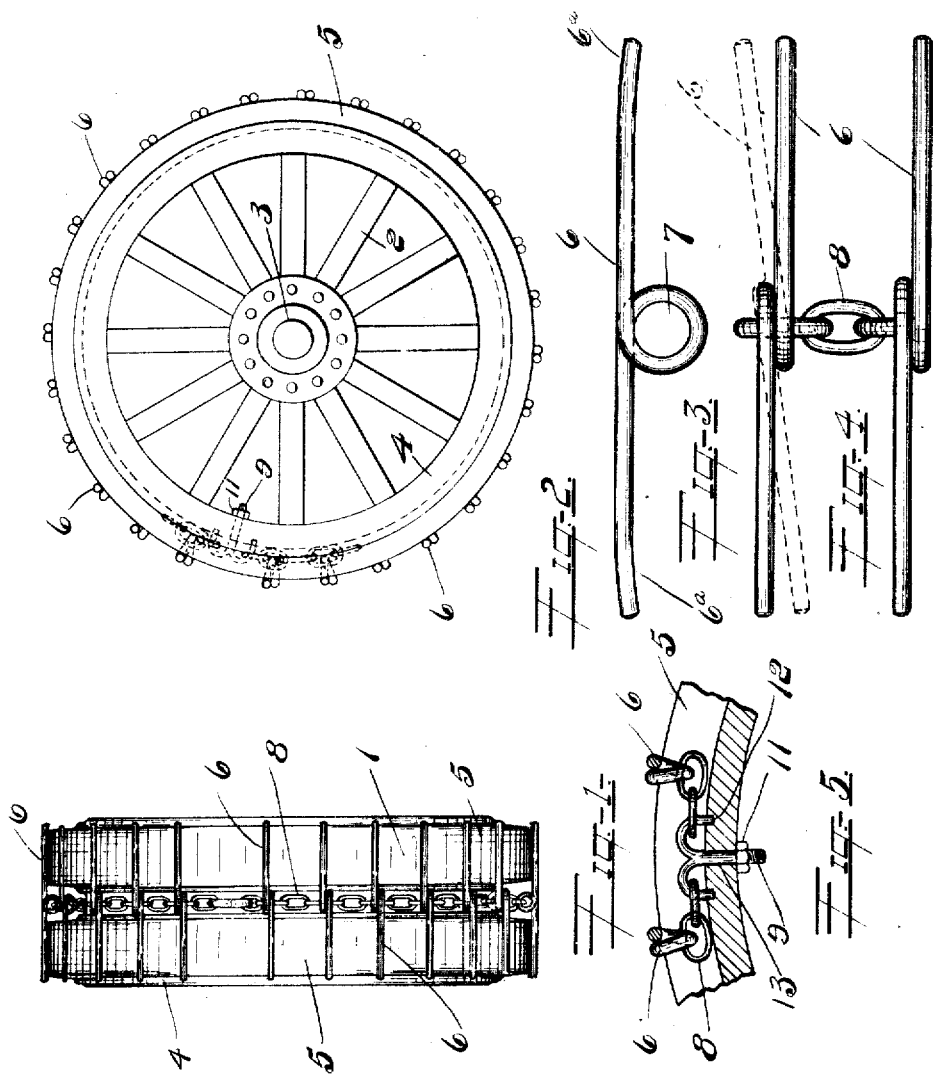

JOHN W. McKENZIE, OF BAY CITY, MICHIGAN.

TIRE ATTACHMENT.

1,308,434.   Specification of Letters Patent.   Patented July 1, 1919.

Application filed January 30, 1918. Serial No. 214,496.

*To all whom it may concern:*

Be it known that I, JOHN W. MCKENZIE, a citizen of the United States of America, residing at Bay City, in the county of Bay and State of Michigan, have invented certain new and useful Improvements in Tire Attachments, of which the following is a specification.

The invention relates to a non-skid attachment for automobile trucks and the like.

An object of the present invention is to improve the construction of non-skid devices and to provide a simple, practical and efficient anti-skidding device designed particularly for use on heavy automobile trucks and the like equipped with spaced twin tires and having an intervening groove between the same.

A further object of the invention is to provide an anti-skidding tire attachment of this character adapted to extend across the faces of the spaced tires and provided with attaching means located in the intermediate groove between the tires so as to be protected by the same.

It is also an object of the invention to provide an anti-skidding tire attachment having spaced transverse members capable of a limited pivotal movement to enable the same to slip on the tire and thereby pass obstructions without injury to the device.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:

Figure 1 is an edge view of an automobile truck wheel provided with an anti-skidding tire attachment constructed in accordance with this invention.

Fig. 2 is a side elevation of the same.

Fig. 3 is an enlarged detail side view of one of the friction gripping members.

Fig. 4 is an enlarged detail plan view of a portion of the device showing two of the friction gripping members and a section of the connecting chain.

Fig. 5 is an enlarged detail sectional view illustrating the fastening means for securing the device to the rim of a wheel.

In the accompanying drawing in which is illustrated the preferred embodiment of the invention, 1 designates a double tired wheel of an ordinary heavy automobile truck having spokes 2 set in a hub 3, but the wheel may be of any other desired construction as will be readily understood. The rim 4 of the wheel is equipped with a pair of tires 5 arranged in spaced relation to provide an intervening groove in which is arranged a fastening means for securing the automobile anti-skidding device to the rim of the wheel.

The anti-skidding tire attachment comprises in its construction transversely disposed friction members 6 constructed of suitable material and extending across the spaced tires and spanning the intervening space between the same and having their terminal portions 6ª curved slightly at the outer side edges of the tires. The friction gripping members are provided with centrally arranged loops 7 preferably formed by coiling the material of which the said members are constructed and extending inwardly from the said members and located within the intervening groove between the spaced tires. The loops 7 are preferably of a diameter less than the thickness of the tires and terminate short of the outer face of the rim as clearly shown in Fig. 5 of the drawing and the said friction gripping members are connected and maintained in spaced relation by a chain 8 located in the intervening groove between the tires and composed of links which are linked into the loops or rings of the friction gripping members. This provides a pivotal or swivel connection between the transverse gripping members and the chain and permits a limited pivotal movement of the gripping members, as illustrated in dotted lines in Fig. 4 of the drawing to permit the said gripping members to slip and pass obstructions without injury, especially when a truck or other motor vehicle equipped with the anti-skidding device is driven close to the curbing of a street. Various other forms of flexible connections may of course be employed and the chain is secured to the rim by a double hook bolt 9 piercing the rim and having a pair of oppositely extending wings or engaging arms which extend through the adjacent links of the chain and connect the same and secure the chain to the rim of the wheel, as clearly shown in Fig. 5 of the drawing. The bolt is equipped with a nut 11 located at the inner face of the rim and the bills of the wings or hooks are received within recesses or seats 12 formed in the outer face of the rim and permitting the said bills to extend below the said outer face whereby the links of the chain are securely confined in the arms or wings of the double hook bolt. This construction will permit the anti-skidding tire attachment to be quickly applied to and readily removed from a wheel. If desired, any number of the above, or additional fastening means may be employed. This will enable the chain to be attached at different points around the rim of the wheel as required. In applying the anti-skidding tire attachment to a wheel the double hook bolt may be arranged in the opening 13 of the rim in a sufficiently loose condition to enable the wings to be withdrawn from the recesses or seats 12 and after the chain and the transverse gripping members have been placed around the wheel the terminal links of the chain may be engaged with the wings of the double hook bolt and the latter may be tightened to draw the wings into the recesses or seats 12. This will securely fasten the anti-skidding device on the wheel.

It will be seen that the anti-skidding device is exceedingly simple, economical, and a durable attachment for double tire wheels for heavy trucks and analogous vehicles and that they can be easily and cheaply manufactured and quickly applied to and removed from the rim of a wheel.

It will also be apparent that the friction gripping members, owing to their limited pivotal movement on the rim, are not liable to be broken and that in the event of injury they may be quickly replaced to repair the device.

What is claimed is:

1. An anti-skidding tire attachment, comprising a securing member adapted to be fastened to a tire, and a transversely extending gripping member pivotally mounted on the securing member and adapted to be held thereby across the tread of the tire for a limited pivotal movement about a radial axis.

2. An anti-skidding tire attachment, comprising a securing member adapted to be fastened to a tire and including circumferentially extending links, and gripping members adapted to lie against the tread of the tire and having inwardly extending transverse loops engaging said links of the securing member and adapted for a limited longitudinal movement thereon to permit the gripping members being deflected by obstructions in the roadway.

3. An anti-skidding tire attachment, comprising a securing member adapted to be fastened to a tire and including circumferentially extending links, and gripping members adapted to lie against the tread of the tire and having inwardly extending transverse loops engaging said links of the securing member to admit the pivoting and a limited longitudinal sliding movement of the gripping members on the links when deflected by obstructions in the roadway.

In testimony whereof I affix my signature.

JOHN W. McKENZIE.